Patented Sept. 26, 1922.

1,430,269

UNITED STATES PATENT OFFICE.

WILLIAM GEORGE WARING, OF WEBB CITY, MISSOURI, ASSIGNOR OF ONE-HALF TO GORDON BATTELLE, OF COLUMBUS, OHIO.

EXTRACTION OF ZINC.

No Drawing.     Application filed August 17, 1921. Serial No. 493,132.

*To all whom it may concern:*

Be it known that I, WILLIAM GEORGE WARING, a citizen of the United States, residing at Webb City, in the county of Jasper and State of Missouri, have invented certain new and useful Improvements in the Extraction of Zinc, of which the following is a specification.

This invention relates to the extraction of zinc; and it comprises an improvement in methods of extracting zinc from roasted ores, oxidized fumes, and the like by the action of hot solutions of ammonium sulfate wherein the basic sulfate of zinc precipitated on cooling such solutions is treated with a solution containing the calculated amount of ammonium carbonate to form basic carbonate of zinc and ammonium sulfate solution which can be returned to the extraction operation; all as more fully hereinafter set forth and as claimed.

In various metallurgical processes treating complex ores in furnaces of the type of the Scotch hearth, the Wetherill furnace, as well as in various reverberatory type furnaces used in roasting and smelting ores, there is a production of oxidized flue dust or fume containing lead and zinc as well, usually, as various other metals and elements. The lead and zinc are contained in the form of oxidized compounds, such as oxids, sulfates, sulfides, etc. Roasted sulfid ores containing lead and zinc are, or may be, of analogous composition and contain zinc and lead in oxidized form. Various other technically available materials also contain lead and zinc in oxidized form. Many methods have been proposed, and some are in use, for treating materials of this type for the purpose of separately recovering the lead and zinc as well as other metals. Some of these methods depend, in principle, upon the fact that the solubility of zinc compounds in a hot strong solution of ammonium sulfate is greater than in a cold solution, while lead compounds are substantially insoluble in the hot solution so that a solution saturated while hot deposits zinc compounds on cooling. In these methods the fume or analogous material is digested with a hot strong solution of ammonium sulfate, the solution separated from the residue and cooled, whereupon there is a deposition or precipitation of material consisting of or containing basic sulfate of zinc. The exact character of this deposited material depends upon the circumstances; the strength of solution, the temperature, etc. Using a saturated solution of sulfate of ammonium which is digested with the material at about the normal boiling point or a little above removed and cooled to 50° to 70° C., the deposition is substantially composed of a basic sulfate of zinc having the empirical formula 5ZnO, $SO_3$. With other strengths of ammonium sulfate solution, other temperatures, etc., the deposit is of a different character, sometimes carrying ammonium sulfate and sulfates of various other metals than zinc. Not all the zinc is deposited in so cooling the liquid but as the liquid goes back for use in extraction, this fact is immaterial.

In a practical embodiment of this method treating roasted ore, oxidized fume, etc., carrying lead and zinc, the material is digested with an ammonium sulfate solution from a previous operation and carrying a certain amount of dissolved zinc compounds. The solution and the fume are heated together, this being best done under some pressure. Any ammonia liberated in this operation is caught and collected in suitable ways. After digesting for an hour or thereabouts, the charge is withdrawn from the digester and the solution separated from the solid residue in any suitable way. The material from the digester may be simply filter-pressed using a heated press. The residue or press cake is submitted to other treatments not here important, including a washing with strong ammonium sulfate solution. The washings serve in making up liquor for another digestion. The hot liquor expressed from the cake is run through a hot chamber filled with shot zinc, zinc scrap, etc. This precipitates silver cadmium, copper, or any other easily reducible metal which may be present. The hot purified liquor is then cooled in any suitable way to about 50° to 70° C. It may, for example, be run into a jacketed tank and stirred. An advantageous way is to spray it into a chamber, producing the desired cooling by self-evaporation. The solid material separated on so cooling is a substantially pure basic sulfate of zinc of the indicated composition. Other ways of extracting the material with hot sulfate of ammonia solutions, as stated, give solutions depositing zinc-containing precipitates on cooling, but these precipitates are also amenable to treatment under the present invention.

The basic sulfate of zinc and other zinc-containing precipitates produced in these methods of extracting zinc are not in themselves marketable materials and they are somewhat difficult to work into merchantable form. The sulfuric acid present cannot readily be driven off by simple heating with production of zinc oxide or the like.

It is the object of the present invention to provide a method whereby basic sulfate of zinc etc. produced in the described manner may be readily converted into high grade materials of marketable nature with an incident economy in the process as a whole.

Considering the basic sulfate of zinc ($5ZnO, SO_3$) produced in the method above described, while it does not contain other metals, it does contain a considerable amount of adhering ammonium sulfate solution; this solution in turn containing unprecipitated, dissolved zinc compounds. The ammonium sulfate may, of course, at least to a large extent, be recovered by washing with water, but since on dilution of the adhering ammonium sulfate solution the contained zinc is partially precipitated, there is some inconvenience in manipulation. In the present method I take the unwashed press cake, still containing a certain amount of mother liquor, and treat it with a solution of ammonium carbonate containing the amount of $NH_3$ corresponding to the $SO_3$ combined with zinc. With greater proportions of ammonia, more or less zinc goes into solution; with less amounts, some $SO_3$ is not removed from the precipitate. The press cake is agitated or otherwise brought into effective contact with the ammonium carbonate solution. A smooth reaction takes place by which the basic zinc sulfate is converted into basic zinc carbonate with formation of sulfate of ammonia. This sulfate of ammonia, together with that of the mother liquor, goes into the solution. The initial contact may be cold, but it is usually best to heat the mixture to boiling, at least in finishing, as this facilitates subsequent filtration and washing. After the reaction is accomplished the mixture is put through a filter press, or otherwise treated, to separate the solid from the liquid, the solid basic zinc carbonate being washed with water in the usual ways. The ammonium sulfate solution goes back to the extraction process. The washings are concentrated to give a strong solution of ammonium sulfate or are heated with lime to recover the ammonia.

The washed basic zinc carbonate is substantially free of $SO_3$ and $NH_3$ and is a material which, by reason of its physical state, is excellently well adapted for pigmentary purposes. It has exceptionally great covering power and makes a very good oil paint. If desired, it may be roasted or calcined at a low temperature to convert it into oxid of zinc; this oxid of zinc being also of good pigmentary quality and being, because of its fine subdivision, well adapted for use as a filler in a rubber manufacture, etc.

In applying the present method to precipitates which are not, like that just described, merely basic sulfate of zinc, analogous results are secured. Any sulfate of ammonia occurring in double salts is of course extracted. Any other metal which may occur as an impurity in the precipitated basic zinc sulfate, or basic zinc sulfate composition, is also extracted.

In the described invention, it will be noted, I have provided a method of cheaply and readily converting basic zinc sulfate, etc., extracted from roasted ore, fume and the like by these methods, into a marketable material with recovery of solvent material suitable for re-use in the extraction process.

Ordinarily, these materials contain enough $SO_3$ to keep the supply of sulfate of ammonia replenished. Where they do not, sulfate of ammonia is added from time to time for replenishment. Where the amount of $SO_3$ is greater, $SO_3$ must be ejected from the system from time to time. This is accomplished by withdrawing sulfate of ammonia solution from the circulation, setting free ammonia with lime or calcium carbonate and converting the ammonia into carbonate of ammonia to be used in the step of treating the precipitated basic sulfate of zinc.

What I claim is:—

1. In the recovery of zinc, the process which comprises leaching a material containing zinc in oxidized form with a hot saturated solution of ammonium sulfate containing zinc sulfate, cooling the solution to precipitate a basic sulfate of zinc, treating the precipitated sulfate of zinc with ammonium carbonate solution in the proportion necessary to form ammonium sulfate with the sulfuric acid present, separating the carbonate of zinc produced and returning the ammonium sulfate solution for re-use in the process.

2. In the extraction of zinc from lead and zinc containing materials by extraction with hot ammonium sulfate solution with subsequent deposition of zinc compounds by cooling said solution, the process which comprises reacting on said zinc compounds with ammonium carbonate solution to convert said zinc compounds into a zinc carbonate and form ammonium sulfate solution.

In testimony whereof, I have hereunto affixed my signature.

WILLIAM GEORGE WARING.